Aug. 8, 1961  J. M. GARDNER  2,995,390
MOUNTINGS FOR RINGS OR DISCS
Filed Sept. 14, 1959
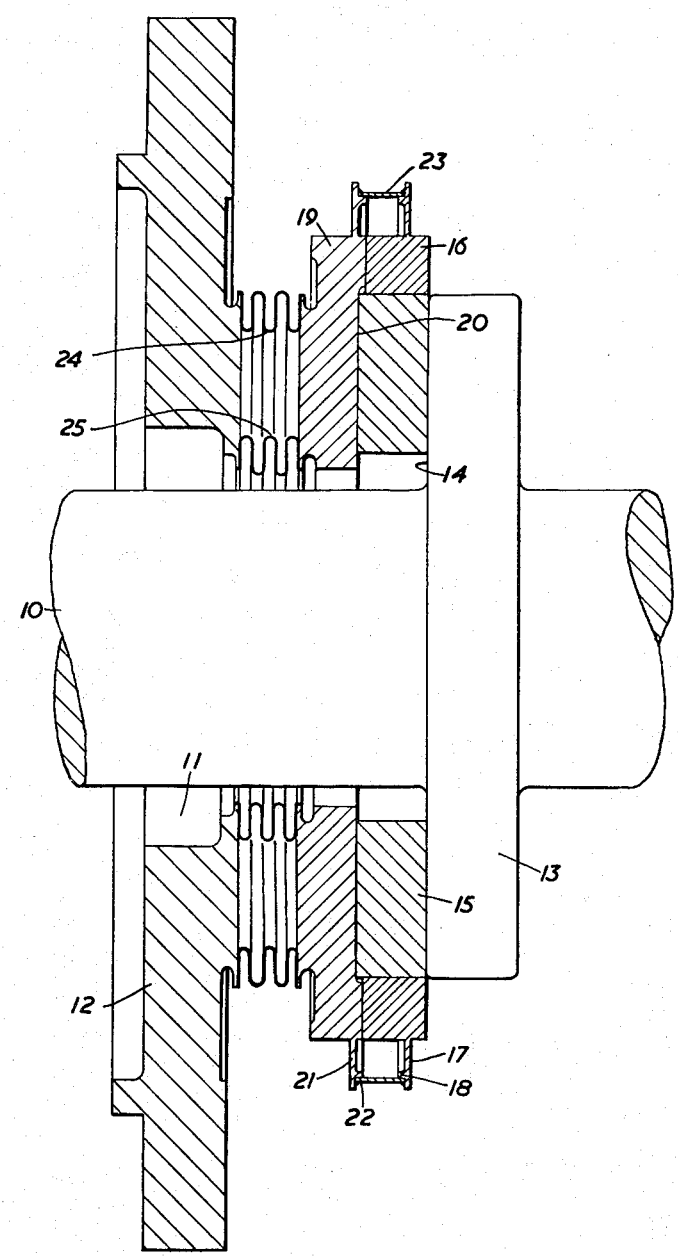
INVENTOR
JOHN M. GARDNER
BY
Watson, Cole, Grindle & Watson
ATTORNEYS

United States Patent Office 2,995,390
Patented Aug. 8, 1961

2,995,390
MOUNTINGS FOR RINGS OR DISCS
John Maddox Gardner, London, England, assignor to D. Napier & Son Limited, London, England, a company of Great Britain
Filed Sept. 14, 1959, Ser. No. 839,866
Claims priority, application Great Britain Sept. 18, 1958
5 Claims. (Cl. 286—11.14)

This invention relates to assemblies comprising rings or discs and mountings therefor, the material of the rings or discs being of a different co-efficient of thermal expansion from the material of the mountings. The invention is applicable more particularly, but not exclusively, to assemblies such as thrust bearings or rotary seals where the ring or disc is made of carbon and the mounting is made of metal. For convenience the invention will be described in relation to carbon rings or discs with metal mountings, but it is to be appreciated that the principles of the invention are applicable to assemblies which employ other materials of different co-efficients of thermal expansion.

A common form of rigid mounting for a carbon ring or disc consists of a metal backing member provided with a cylindrical flange, the carbon ring or disc being a shrunk fit in the mounting with its rear face abutting against a flat surface of the backing member and with its outer periphery surrounded and gripped by the cylindrical flange. Such a mounting is generally satisfactory where only a relatively small range of temperature variation is encountered. On the other hand, where a wide range of temperatures must be tolerated disadvantages arise from the differential thermal expansions of the metal backing member and the carbon ring or disc, for the following reason. The backing member is shrunk on the carbon ring or disc which distorts the latter causing its front surface to become slightly conical, which is then machined flat. However, the distorting forces are still present. When the operating temperature is high, the differential expansion which occurs tends to relieve the distorting forces in the carbon ring or disc, which therefore tends to return to its original state, so that the front surface is again conically deformed but in the opposite sense. This conicity may cause excessive wear, or poor sealing in the case of a rotary seal. It is an object of the present invention to provide a solution to this problem.

According to the present invention in a ring or disc and mounting assembly wherein the material of the ring or disc has a different co-efficient of thermal expansion from the material of the mounting and which is effective over a wide range of operating temperatures, the mounting comprises an annulus which is a shrunk fit around the periphery of the ring or disc, and a backing member which abuts against the rear face of the ring or disc and to which the said annulus is connected in a manner permitting relative radial movement between the annulus and the backing member.

In this manner the strains imposed on the ring or disc due to differential thermal expansion between itself and the surrounding annulus are essentially in the radial direction and are substantially uniform over the thickness of the ring or disc, and no appreciable bending forces are applied to the ring or disc due to differential radial expansion of the backing member. Consequently the front surface of the ring or disc remains essentially flat throughout the range of operating temperatures.

The connection between the annulus and the backing member preferably consists of a thin hoop connected in a gas-tight manner between radially extending parallel flanges on both these members. This not only permits the slight relative radial movements necessary to accommodate differential expansions and contractions, but also provides an effective gas seal between the backing member and the annulus. This is desirable in certain installations where the ring or disc forms part of a high pressure gas seal assembly.

The invention may be performed in various ways, and a specific embodiment, namely a rotary face seal assembly employing a carbon ring, will now be described by way of example with reference to the accompanying drawing, which is a cross-section through the assembly.

Referring to the drawing, a rotary shaft 10 passes through an aperture 11 in a stationary casing 12 and is provided with a collar 13 having an annular sealing face 14 engaged by a stationary annular carbon ring 15. Surrounding the carbon ring 15 with a shrunk fit thereon is a metal annulus 16. This metal annulus has a thin external flange 17 provided with a lip 18. A metal backing member 19 having a flat face 20 is provided with a thin flange 21 and a lip 22. The assembly comprising the carbon ring 15 and the metal annulus 16 is attached to the backing member 19 by means of a thin metal hoop 23 which is located by the lips 18 and 22 and is welded or brazed to the flanges 17 and 21, thereby providing a gas-tight seal between the metal annulus 16 and the backing member 19. The axial flexibility of the thin flanges 17 and 21 permits the face of the carbon ring remote from the sealing face 14 to seat against the flat face 20 of the backing member 19, while the radial flexibility of the hoop 23 permits relative radial movement between the metal annulus 16 and the backing member. The backing member is resiliently mounted on the casing 12 by means of annular bellows 24 and 25.

What I claim as my invention and desire to secure by Letters Patent is:

1. An assembly comprising a disc having a periphery and two flat side surfaces and mounting means for said disc, the material of said disc having a different coefficient of thermal expansion from the material of said mounting means, said mounting means comprising an annulus which is a shrink fit around the periphery of said disc, a backing member which abuts against one of said flat side surfaces of said disc, said annulus having an external flange axially spaced from said backing member, and means connecting said annulus to said backing member and permitting relative radial movement between said annulus and said backing member, said connecting means comprising a hoop the radial thickness of which is substantially less the axial width thereof.

2. A disc and mounting assembly as defined in claim 1 wherein said backing member has an external flange fixed to said hoop.

3. A disc and mounting assembly as defined in claim 1 wherein said backing member has an external flange and wherein the external flanges of said annulus and said backing member for axially-extending lips engaging said hoop and locating same.

4. A disc and mounting assembly as defined in claim 1 wherein said backing member has an external flange fixed to said hoop and wherein flanges on said annulus and said backing member are flexible in the axial direction.

5. A carbon ring and mounting assembly, said carbon ring having a flat front face, a flat rear face, and a circular periphery, said mounting comprising a metal annulus which is a shrink fit around the periphery of said carbon ring, a metal backing member which abuts against said rear face of said carbon ring, said backing member having an external radially-extending flange, said annulus having an external radially-extending flange parallel to and axially spaced from said first mentioned flange, and means connecting said metal annulus to said metal backing member and permitting relative radial movement between said annulus and said backing member, said connecting means comprising a hoop of gas-tight sealing engagement with both said flanges.

References Cited in the file of this patent
UNITED STATES PATENTS

| | | |
|---|---|---|
| 2,425,209 | Snyder et al. | Aug. 5, 1947 |
| 2,917,329 | Laser | Dec. 15, 1959 |